United States Patent
Borghetti et al.

(10) Patent No.: US 8,145,918 B2
(45) Date of Patent: Mar. 27, 2012

(54) MONITORING SYSTEM PROCESSES ENERGY CONSUMPTION

(75) Inventors: Stefano Borghetti, Rome (IT); Leonida Gianfagna, Rome (IT); Antonio Mario Sgro, Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/147,803

(22) Filed: Jun. 27, 2008

(65) Prior Publication Data

US 2009/0006878 A1    Jan. 1, 2009

(30) Foreign Application Priority Data

Jun. 28, 2007    (EP) ..................................... 07111231

(51) Int. Cl.
*G06F 1/26* (2006.01)
(52) U.S. Cl. .................. 713/300; 713/310; 713/320
(58) Field of Classification Search .................. 713/300, 713/310, 320, 322, 323, 324; 718/1, 100, 718/102, 104, 105
See application file for complete search history.

(56) References Cited

U.S. PATENT DOCUMENTS

| | | | |
|---|---|---|---|
| 5,964,879 A | 10/1999 | Dunstan et al. | |
| 6,151,568 A | 11/2000 | Allen et al. | |
| 6,907,010 B2 | 6/2005 | Zhang | |
| 7,036,034 B2 | 4/2006 | Kobayashi et al. | |
| 7,197,652 B2 | 3/2007 | Keller, Jr. et al. | |
| 7,730,331 B2 | 6/2010 | Yoon et al. | |
| 7,849,344 B2 | 12/2010 | Karstens | |
| 7,894,421 B2 | 2/2011 | Kwan | |
| 2002/0144167 A1 | 10/2002 | Kobayashi et al. | |
| 2003/0112796 A1 | 6/2003 | Kwan | |
| 2003/0149904 A1 | 8/2003 | Kim | |
| 2004/0203402 A1 | 10/2004 | Zhang | |
| 2006/0242441 A1* | 10/2006 | Yoon et al. | 713/320 |
| 2007/0094519 A1 | 4/2007 | Yamamoto | |
| 2008/0082851 A1 | 4/2008 | Zettler | |

(Continued)

FOREIGN PATENT DOCUMENTS

JP    2009075934 A    4/2009

(Continued)

OTHER PUBLICATIONS

Li et al., "Run-time Modeling and Estimation of Operating System Power Consumption," ACM Sigmetrics Performance Evaluation Review, vol. 31, Iss. 1, Jun. 2003, 12 pp.

(Continued)

*Primary Examiner* — Nitin Patel
(74) *Attorney, Agent, or Firm* — Yee & Associates, P.C.; Jeffrey S. LaBaw

(57) ABSTRACT

A method and system for monitoring power consumption of software applications. In a preferred embodiment of the present invention, a new feature is inserted in a system availability monitoring product which estimates the power consumption of the system, starting from the measurement of some parameters collected by a monitoring tool. All systems are impacted by energy consumption, by the usage of its resources (hard-disk, CPU, memory, CDROM, etc.); when the usage of these components increases, the energy consumption increases too. The usage of the resources can be calculated through the monitoring tool according to some specific parameters. The calculated metrics of the usage are based on the measurement of the time during which a resource is in a predetermined status. Each resource has an associated table for determining the expected power consumption according to the status.

20 Claims, 4 Drawing Sheets

U.S. PATENT DOCUMENTS

| | | | |
|---|---|---|---|
| 2009/0006878 | A1 | 1/2009 | Borghetti et al. |
| 2009/0007108 | A1* | 1/2009 | Hanebutte .................. 718/1 |
| 2009/0007128 | A1 | 1/2009 | Borghetti et al. |
| 2009/0024863 | A1 | 1/2009 | Karstens |
| 2009/0094473 | A1 | 4/2009 | Mizutani |
| 2009/0195602 | A1 | 8/2009 | Shimada |
| 2010/0048139 | A1 | 2/2010 | Seo et al. |
| 2010/0174928 | A1 | 7/2010 | Borghetti et al. |

FOREIGN PATENT DOCUMENTS

| | | |
|---|---|---|
| KR | 10-0446510 B1 | 8/2004 |
| KR | 20070011690 A | 1/2007 |
| WO | 2007130184 A1 | 11/2007 |

OTHER PUBLICATIONS

Simunic, "Dynamic Management of Power Consumption," Robert Graybill and Rami Melhen, editors, Power Aware Computing, Kluwer Academic Publishers, Ch. 2, 2002, pp. 1-24.

Chang et al., "Energy Driven Statistical Profiling: Detecting Software Hotspots," In Workshop on Power-Aware Computer Systems (2002), pp. 1-11.

Contreras et al., "Power prediction for Intel XScale processors using performance monitoring unit events," Proceedings of the 2005 International Symposium on Low Power Electronics and Design, Aug. 2005, pp. 221-226.

Jayaseelan, et al., "Estimating the Worst-Case Energy Comsumption of Embedded Software," Proceedings of the 12th IEEE Real-Time and Embedded Technology and Applications Symposium, Apr. 2006, pp. 81-90.

"IBM Tivoli Intelligent Orchestrator," Product Overview, 4 pp., accessed Nov. 9, 2011, http://web.archive.org/web/20070310215605/http://www-306.ibm.com/software/tivoli/products/intell-orch/.

"Dynamic Power Management," SourceForge.net, pp. 1-2, accessed Sep. 30, 2011, http://dynamicpower.sourceforge.net/.

Ethier, "QNX Technical Articles, implementing Power Management on the Biscayne SH7760 Reference Platform Using the QNX Neutrino RTOS," QNX Software Systems, pp. 1-5, accessed Sep. 30, 2011, http://www.qnx.com/developers/articles/article_296_2.html.

USPTO Notice of Allowance dated Aug. 22, 2011 regarding U.S. Appl. No. 12/348,462.

USPTO Non-final office action dated May 3, 2011 regarding U.S. Appl. No. 12/348,462.

USPTO Non-final office action dated Jun. 30, 2011 regarding U.S. Appl. No. 12/147,855.

Hsu et al., "Effective Dynamic Voltage Scaling through Accurate Performance Modeling," DOE LDRD Program through Los Alamos National Laboratory contract W-7405-ENG-36, technical report LA-UR-03-7582, pp. 1-10.

* cited by examiner

MONITORING SYSTEM PROCESSES ENERGY CONSUMPTION

FIELD OF THE INVENTION

The present invention relates to the data processing field. More specifically, the present invention relates to methods and systems for monitoring power consumption in a data processing system. The invention further relates to a computer program for performing the method, and to a product embodying the program. Moreover, the invention also relates to a corresponding apparatus.

This application claims foreign priority benefit of foreign application EP 07111231.2 (EP07111231) filed on Jun. 28, 2007.

BACKGROUND ART

Reducing energy consumption in data processing system operations is becoming an increasingly important requirement. Energy saving is a very important issue due to environmental impact and to increasing costs. Furthermore, risks and costs related to energy supply interruption (blackout) caused by high consume and excessive request by the users must be taken into account. In a data processing system it is known to monitor the consumption of the single devices and to apply some correction actions in order to optimize the total power consumption of a data processing system. E.g. U.S. Pat. No. 7,197,652 discloses a method for energy management in a multithread data processing system. The method provides per-device usage evaluators within performance monitor units which monitor the use of connected devices. However power consumption can depend also on the way the devices are used, i.e. it can depend on the software applications being run on the system and on the SW and HW resources used by the applications.

It would therefore be highly desirable an improved method which could help monitoring the system power consumption in a more precise and dynamic way taking into consideration the power consumption caused by the single SW applications.

It is an object of the present invention to provide a method and a system which alleviates the above drawbacks.

SUMMARY OF THE INVENTION

According to the present invention we provide a method of monitoring power usage in a data processing system comprising a plurality of resources, each resource having a predefined datasheet defining a set of possible status of the resource, each status having an associated expected power usage, the method including the steps of: monitoring the activities of at least one software application running on the data processing system, the at least one software application using at least one of the plurality of resources; tracking any use of each at least one resource made by the at least one software application and for each tracked use detecting the status of the resource; estimating the power usage of the at least one software application according to the tracked use, the detected status and the associated expected power usage.

Another aspect of the present invention provides a computer program for performing the above-described method.

A still further aspect of the invention provides a program product embodying this program.

Moreover, another aspect of the invention provides a corresponding apparatus for implementing the above method.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENTS

Figure 1:
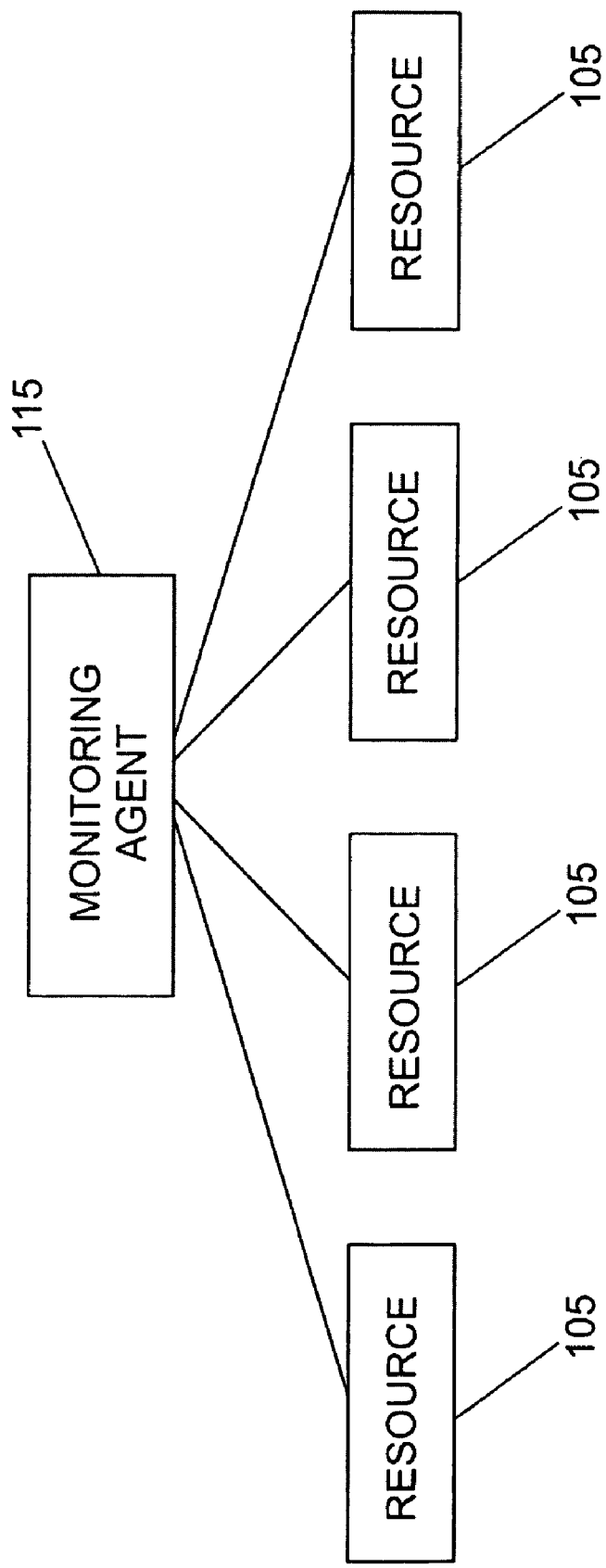
FIG. 1 is a schematic block diagram of a data processing system in which the method of the invention is applicable.

With reference in particular to FIG. 1, a data processing system is depicted. The system includes a plurality of resources 105. The resources 105 can be storage devices, CPUs, graphic cards, hard disks and more generally any kind of system resource which cause a power usage during execution of a SW process. The resources 105 communicate with a system monitoring agent 115 which collects information about resources activity through system API (i.e. via software), e.g. CPU usage per process (SW application) or disk read/write per process. Monitoring agent 115 implements a central repository where consumption data of the system is collected and managed. The present invention may be implemented in a Monitoring Product e.g. IBM Tivoli Monitoring system, but more generally in any system implementing system monitoring activities, e.g. Microsoft MOM or QUEST Big Brother.

Figure 2:
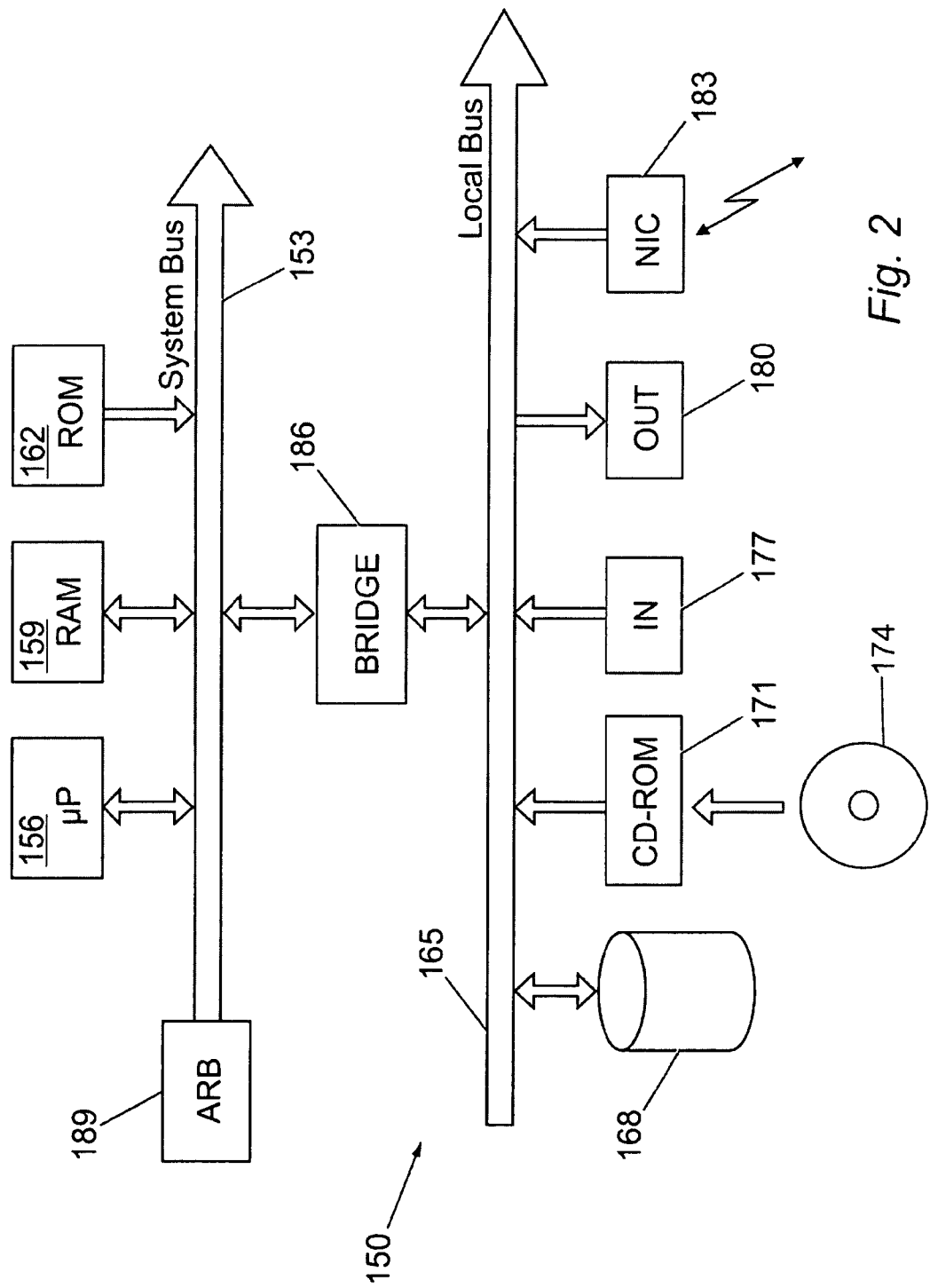
FIG. 2 shows the functional blocks of a generic computer of the system.

As shown in FIG. 2, a generic computer of the system (workstations, local server, or peripherals) is denoted with 150. The computer 150 is formed by several units that are connected in parallel to a system bus 153. In detail, one or more microprocessors (µP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized, or even in a stand-alone computer.

Figure 3:
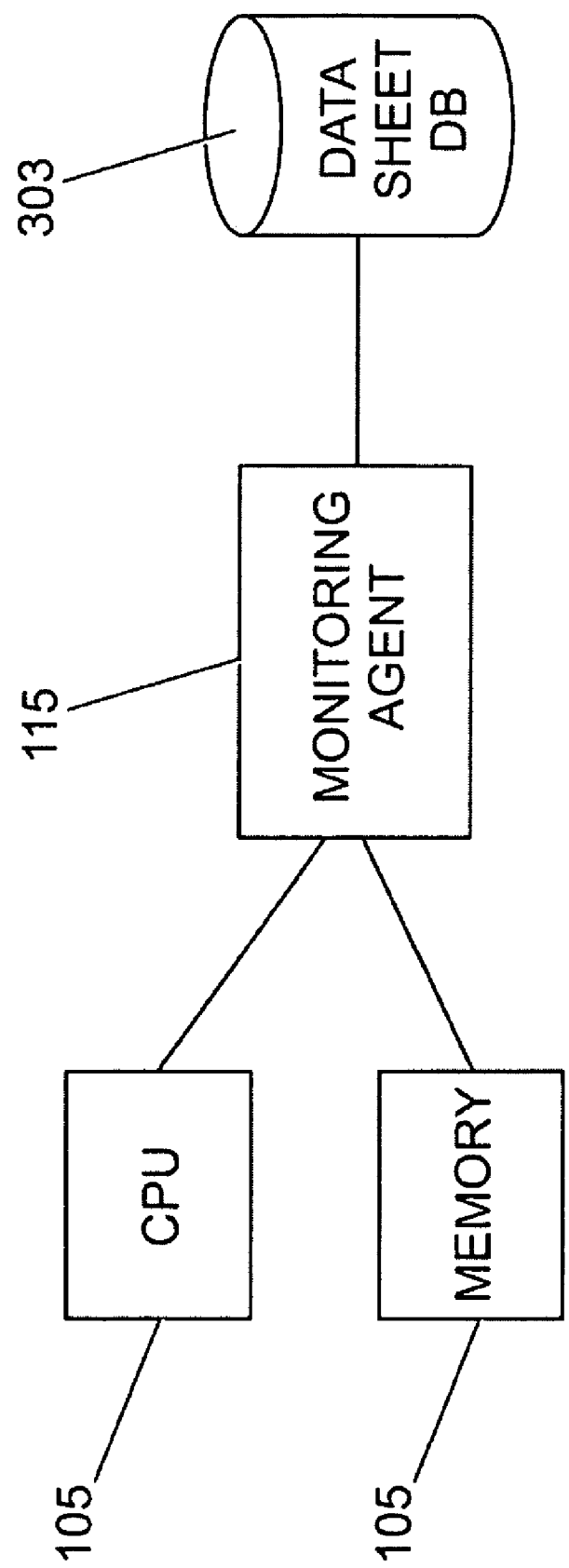
FIG. 3 depicts the main components that can be used for practicing the method.

Considering now FIG. 3, the main components that can be used to practice the method of a preferred embodiment of the invention are illustrated. The information (programs and data) is typically stored on the hard-disks of the different computers and loaded (at least partially) into the corresponding working memories when the programs are running.

A Monitoring Agent 115 controls and executes monitoring operations on several resources 105, connected by a communication network. The set of resources 105 includes e.g. hard disks, CPUs, memories, network cards, printers, backup devices, whose consumption is stored in repository 303 which contains all information available on each monitored resource. This information is normally available through devices datasheet provided by device manufacturer.

The monitoring Agent 115 controls a potentially large set of resources 105, which can even be distributed over a plurality of interconnected systems. In FIG. 3 as an example only two resources are shown: a CPU and a Memory. The monitoring agent 115 monitors the usage of resources per process. Then the monitoring agents 115 looks on the datasheet repository 303 where an estimate of the consumption for each activity is stored: putting together the two measures an expected consumption of the resource is estimated. According to a preferred embodiment of the present invention, repository 303 contains values which are obtained from manufacturers energy consumption datasheets which are to be combined with the usage metrics collected by Monitoring Agent 115 in order to obtain the final energy consumption estimate; however other possible solutions are available: e.g. the values stored could be the results of historical measurement which have been stored for future reuse. According to a preferred embodiment of the present invention, the above data gathering method is implemented by using IBM Tivoli Monitoring product; it is however understood by those skilled in the art that other systems, producing similar results could be used instead.

In a preferred embodiment of the present invention a new feature is inserted in a system availability monitoring product which estimates the power consumption of the system starting from the measurement of some parameters collected by the IBM Tivoli Monitoring tools. State of the art monitoring products do not provide integrated solutions which are able to effectively monitor power and energy consumption. All systems are impacted by energy consumption, by the usage of its resources (hard-disk, CPU, memory, CD-ROM, etc.); when the usage of these components increases, the energy consumption increases as well. The usage of each resource can be calculated through Monitoring tool according to some specific parameters. In a preferred embodiment of the present invention the calculated metrics of the usage are based on the measurement of the time during which a resource is in a predetermined status. Each resource has an associated table which determines the expected power consumption of the resource according to the status. According to a preferred embodiment of the present invention a possible table describing a resource (in this example it is a hard disk) is the following:

| STATUS | EXPECTED POWER (W) |
|---|---|
| 1 Sleep | 0.15 |
| 2 Idle | 1.6 |
| 3 Standby | 0.35 |
| 4 Active | 3.2 |
| 5 Seeking | 4.1 |
| 6 Spin up | 4.2 |

Let's suppose that during the execution of a SW Application A, hard disk HD1 has been detected by Monitoring tools to be X seconds in status 2, Y seconds in status 4 and Z seconds in status 5. The Monitoring Agent of the present invention puts together all this information to estimate a total consumption of hard disk HD1 when used by SW Application A. Similar calculations are done for each resource used by SW Application A and a total power consumption for SW Application A is estimated by the system. Each component has an associated table with the description of power consumption related to the component status that can be checked during power measurements.

Figure 4:
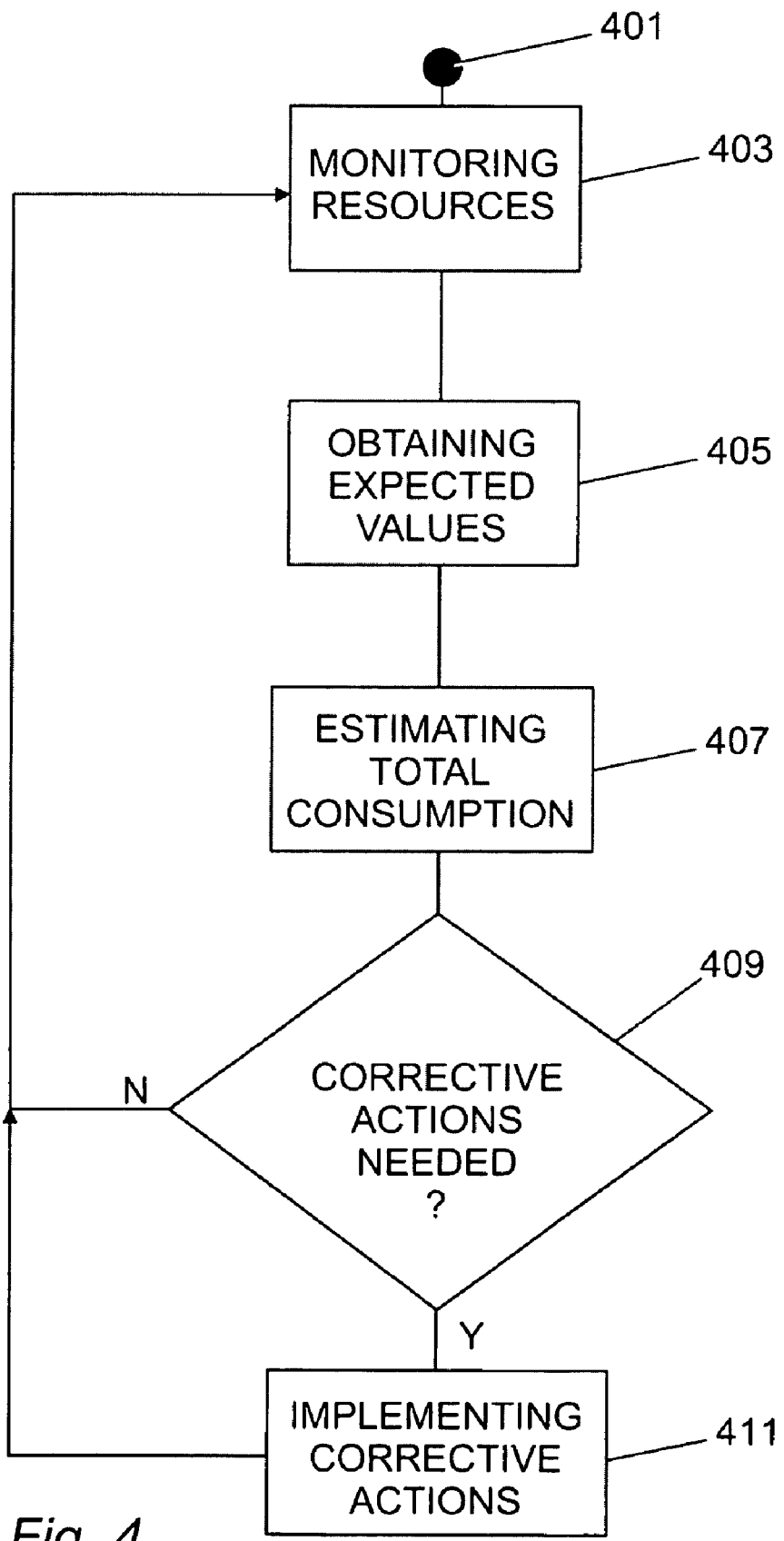
FIG. 4 shows a diagram describing the flow of activities relating to an illustrative implementation of the method.

Considering now FIG. 4, the logic flow of generating a an estimate of the total power consumption of a SW Application according to an embodiment of the invention is represented. The method begins at the black start circle 401. Continuing to block 403 the system resources used by the SW Application are monitored, e.g. by Tivoli Monitoring tool. The list of possible monitored resources includes storage devices, CPUs, graphic cards, hard disks and more generally any kind of system resource which cause a power usage during execution of a SW application. As explained above the system calculates metrics of the usage which are based on the measurement of the time during which a resource is in a predetermined status. Each resource has an associated table, determining the expected power consumption according to the status. These tables are queried at step 405 for obtaining the expected values of the power consumption by each resource according to the detected status. At step 407 the total consumption of the SW Application is estimated putting together the calculated metrics and the expected values collected in the previous steps. The system can now decide (step 409) whether any corrective actions are needed, due to an excessive power consumption (step 411) or simply notify the user of a possible problem. Those skilled in the art will easily appreciate that other actions could be implemented instead, e.g. more dramatic corrective measures could be put in place when a predetermined danger thresholds is reached: for example the access to a resource could be suspended if the overall functioning of the system is at danger.

Similar considerations apply if programs and data are structured in a different manner, if other modules or functions are provided, or if the information is stored in equivalent memory structures.

Similar considerations apply if the method includes equivalent or additional steps.

Alternatively, for example different methods of obtaining the information on the monitored resources can be used, depending also on the operating system on which the system is installed. It would be possible for example that a License Management tool is adapted for collecting such information.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

In any case, the method of the invention can be used for discovering, inventorying or metering any kind of software products (such as video games, multimedia works, and the like).

In addition, the programs can be distributed on any other computer readable medium (such as one or more DVDS); alternatively, the programs are pre-loaded onto the hard-disks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of monitoring power usage in a data processing system comprising a plurality of resources, each resource having a predefined datasheet defining a set of possible status of the resource, each status having an associated expected power usage, the method including the steps of:
   the data processing system monitoring the activities of at least one software application running on the data processing system, the at least one software application using at least one of the plurality of resources;
   the data processing system tracking any use of each at least one resource made by the at least one software application and for each tracked use detecting the status of the resource; and
   estimating the power usage of the at least one software application according to the tracked use, the detected status and the associated expected power usage.

2. The method of claim 1 wherein the plurality of resources includes a CPU.

3. The method of claim 1 wherein the plurality of resources includes a hard disk.

4. The method of claim 1 further comprising the step of:
   responsive to the estimated power usage exceeding a predetermined thresholds, applying predefined corrective actions.

5. The method of claim 1 further comprising the steps of:
   estimating the power usage of each at least one resource
   responsive to the estimated power usage of at least one resource exceeding a predetermined thresholds, applying predefined corrective actions.

6. The method of claim 4, wherein corrective actions include notifying the system administrator.

7. The method of claim 5, wherein corrective actions include suspending the at least one resource whose estimated power usage has exceeded the predetermined thresholds.

8. A computer program tangibly stored in a computer readable storage device for performing a method of monitoring power usage in a data processing system comprising a plurality of resources, each resource having a predefined datasheet defining a set of possible status of the resource, each status having an associated expected power usage, when the computer program is executed on a data processing system, the method including the steps of:
   monitoring the activities of at least one software application running on the data processing system, the at least one software application using at least one of the plurality of resources;
   tracking any use of each at least one resource made by the at least one software application and for each tracked use detecting the status of the resource; and
   estimating the power usage of the at least one software application according to the tracked use, the detected status and the associated expected power usage.

9. The computer program of claim 8 wherein the plurality of resources includes a hard disk.

10. The computer program of claim 8, wherein the method further comprises a step of:
    responsive to the estimated power usage exceeding a predetermined thresholds, applying predefined corrective actions.

11. The computer program of claim 10, wherein corrective actions include notifying the system administrator.

12. The computer program of claim 8, wherein the method further comprises steps of:
    estimating the power usage of each at least one resource
    responsive to the estimated power usage of at least one resource exceeding a predetermined thresholds, applying predefined corrective actions.

13. The computer program of claim 12, wherein corrective actions include suspending the at least one resource whose estimated power usage has exceeded the predetermined thresholds.

14. A system for monitoring power usage in a data processing system comprising a plurality of resources, each resource having a predefined datasheet defining a set of possible status of the resource, each status having an associated expected power usage, the system comprising a data processor coupled to a memory that includes program instructions that are operable by the data processor to perform a method including the steps of:
    monitoring the activities of at least one software application running on the data processing system, the at least one software application using at least one of the plurality of resources;
    tracking any use of each at least one resource made by the at least one software application and for each tracked use detecting the status of the resource; and
    estimating the power usage of the at least one software application according to the tracked use, the detected status and the associated expected power usage.

15. The system of claim 14 wherein the plurality of resources includes a CPU.

16. The system of claim 14 wherein the plurality of resources includes a hard disk.

17. The system of claim 14 further comprising a step of:
    responsive to the estimated power usage exceeding a predetermined thresholds, applying predefined corrective actions.

18. The system of claim 17, wherein corrective actions include notifying the system administrator.

19. The system of claim 14 further comprising steps of:
    estimating the power usage of each at least one resource
    responsive to the estimated power usage of at least one resource exceeding a predetermined thresholds, applying predefined corrective actions.

20. The system of claim 19, wherein corrective actions include suspending the at least one resource whose estimated power usage has exceeded the predetermined thresholds.

* * * * *